March 2, 1971      F. T. GOSTOMSKI      3,567,271
LOADING, UNLOADING AND LEVELING MEANS FOR CAMPERS AND THE LIKE
Filed Aug. 19, 1966      3 Sheets-Sheet 1
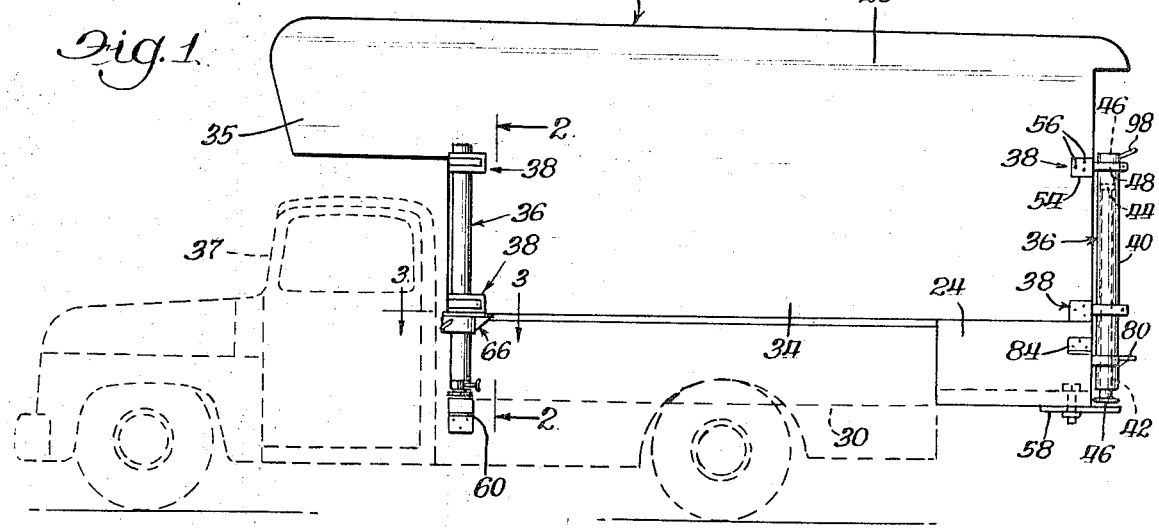
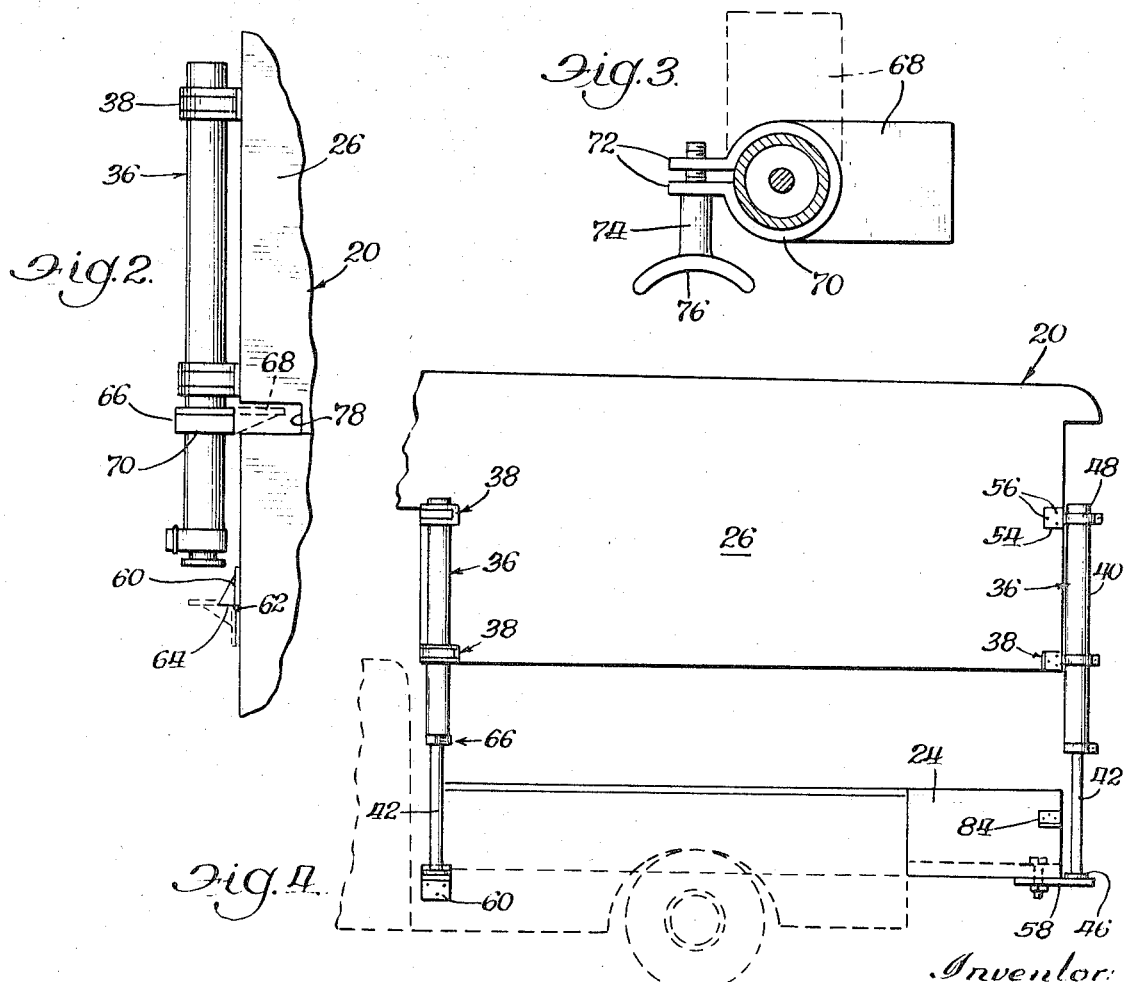
Inventor:
Frank T. Gostomski
By Ralph M. Faust
Atty.

March 2, 1971     F. T. GOSTOMSKI     3,567,271
LOADING, UNLOADING AND LEVELING MEANS FOR CAMPERS AND THE LIKE
Filed Aug. 19, 1966     3 Sheets-Sheet 2
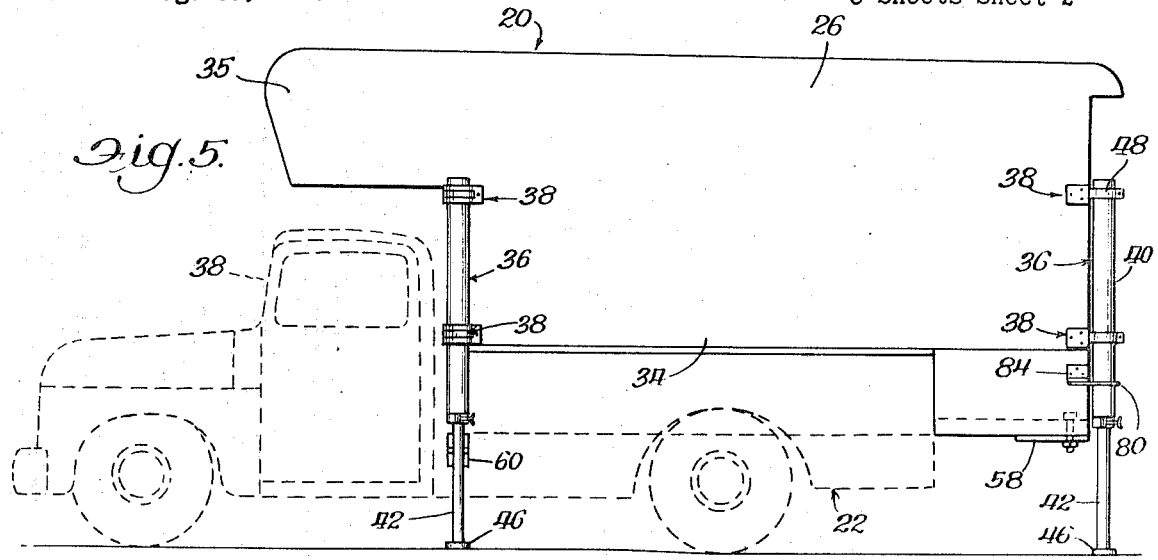
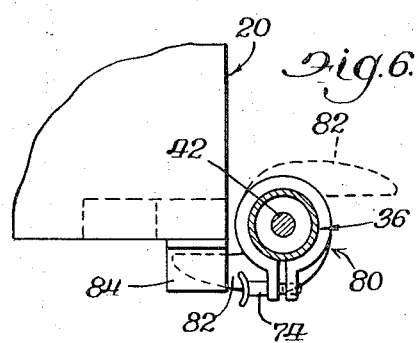
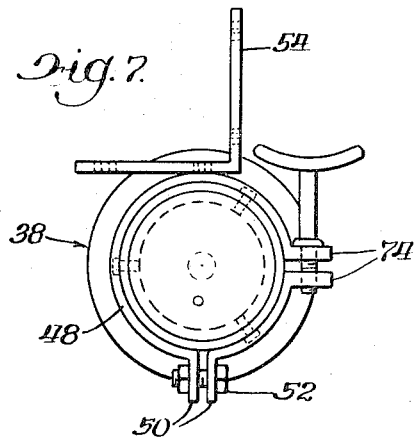
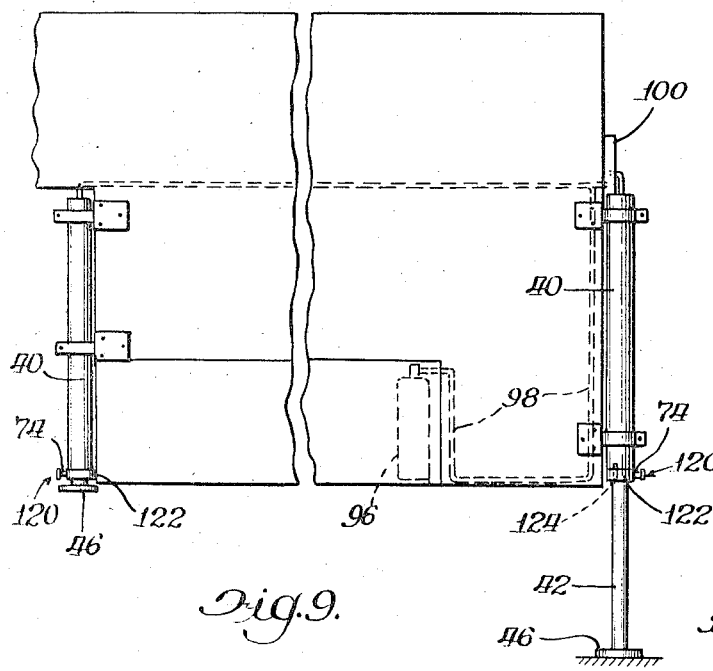
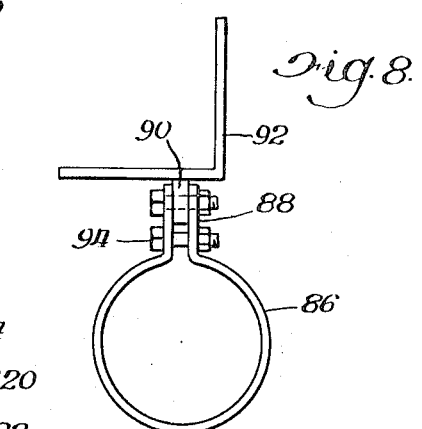
Inventor:
Frank T. Gostomski
By Ralph M. Faust
Atty.

March 2, 1971    F. T. GOSTOMSKI    3,567,271
LOADING, UNLOADING AND LEVELING MEANS FOR CAMPERS AND THE LIKE
Filed Aug. 19, 1966    3 Sheets-Sheet 3
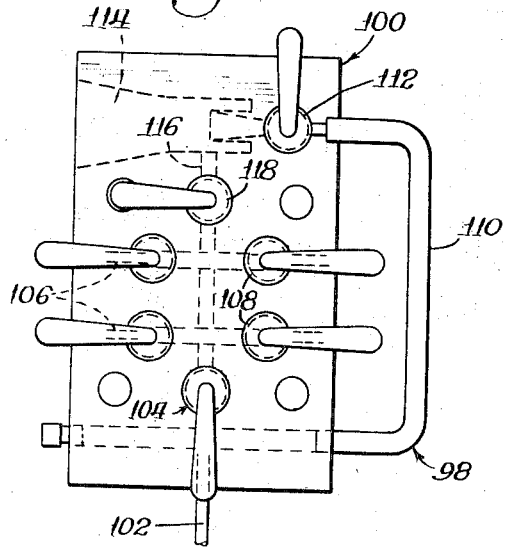
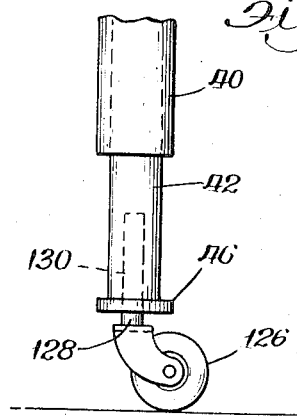
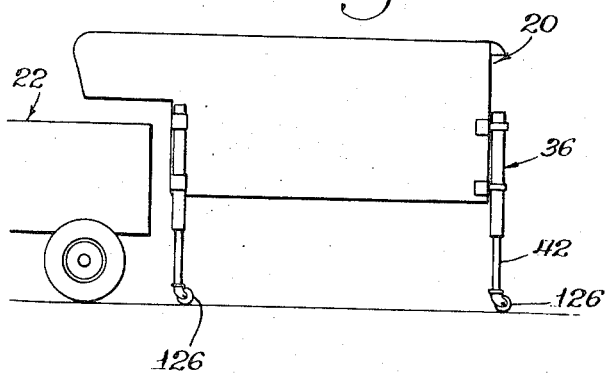
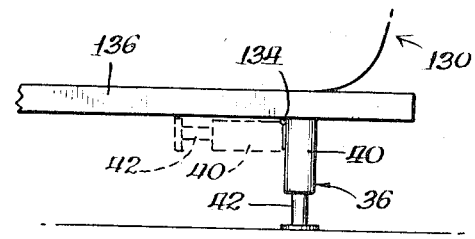
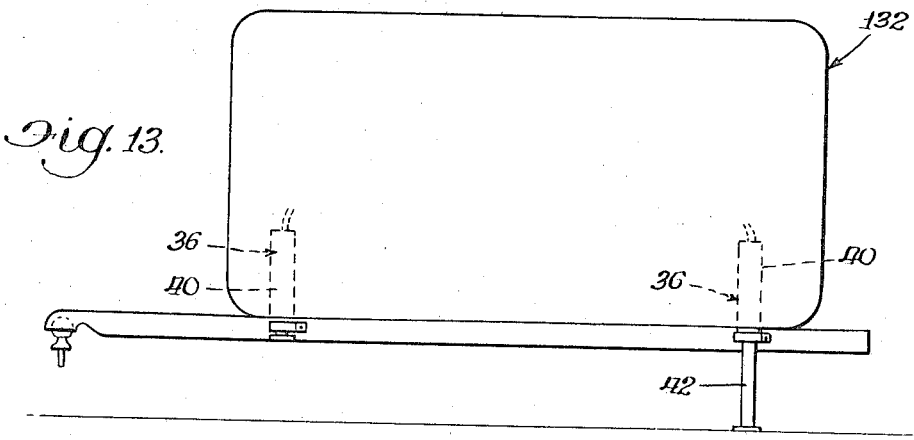
Inventor:
Frank T. Gostomski
By Ralph M. Faust
Atty.

United States Patent Office 3,567,271
Patented Mar. 2, 1971

3,567,271
LOADING, UNLOADING AND LEVELING MEANS
FOR CAMPERS AND THE LIKE
Frank T. Gostomski, 3019 54th Ave. E.,
Tacoma, Wash. 98424
Filed Aug. 19, 1966, Ser. No. 573,708
Int. Cl. B60p 3/32
U.S. Cl. 296—23                                      3 Claims

ABSTRACT OF THE DISCLOSURE

Camper units of the type carried on a vehicle are provided with extensible jacks secured to the camper and have portions movable so that the camper may be raised or lowered or supported on the ground independently of the vehicle. Such camper may be made of independently movable telescoping sections and the jacks arranged to elevate the sections either individually or as a unit.

---

The present invention relates to loading, unloading, and leveling means for campers and the like. Although the invention is particularly adapted to campers, it is not limited thereto and may be adapted to any device that is to be raised and lowered, and leveled.

A broad object of the invention is to provide means of the foregoing general character that is easily manipulate and in the use of which great manual force is not required, and which is quick in operation.

Another object is to provide means of the foregoing general character having a novel construction and arrangement utilizing power means such as pneumatic or hydraulic devices which serve as jack members.

Still another object is to provide means of the foregoing character especially adaptable to use with telescoping type camper units, and when so used capable of selectively raising or lowering the upper part of the camper unit, or the whole unit together.

A further object is to provide means of the foregoing character in a novel arrangement providing great stability in the camper when supporting it.

An additional object is to provide in means of the foregoing character novel, locking means for the extensible elements of the jack members for locking them both in retracted position for travel, and in extended position when the camper is supported by the jack members.

A still further object is to provide means of the foregoing character in the use of which the camper can be lowered completely to the ground.

Still another object is to provide means of the foregoing character which is extremely compact and adds very little to the width of the camper, in keeping with regulations concerning overall width of road vehicles, and as applied to certain kinds of camping vehicles such as trailers, add nothing to the width thereof, being contained entirely within the vertical protection of the vehicle.

Still another object is to provide means of the foregoing character which is extremely simple and easy to apply to the vehicle.

A still further object is to provide means of the foregoing character in which casters may be incorporated for rendering a camper mobile when supported thereby so as to facilitate handling of the camper.

Other objects and advantages of the invention will appear from the following detail description taken in conjunction with the accompanying drawings wherein:

FIG. 1 is a side elevational view of a camper mounted on a truck, with the device of the present invention mounted on the camper;

FIG. 2 is a view taken substantially at line 2—2 of FIG. 1;

FIG. 3 is a view taken at line 3—3 of FIG. 1;

FIG. 4 is a view similar to FIG. 1 but with the upper part of the camper unit in elevated position;

FIG. 5 is a view similar to FIGS. 1 and 4 but with the whole camper unit, together, in elevated position;

FIG. 6 is a view taken at line 6—6 of FIG. 5;

FIG. 7 is a view of a mounting means, including a bracket, for securing a jack member to the camper, viewed axially of the jack member;

FIG. 8 is a view showing a different form of means for mounting the jack member on the camper;

FIG. 9 is a small scale view of a camper with jack members secured thereto, one being in extended position and another in retracted position, and showing lock clamps utilized for locking the extensible elements in position in each case;

FIG. 10 is an elevational view of a control unit of the valving control means of the apparatus and indicating the fluid lines leading to the individual jack members;

FIG. 11 is a detail view of a jack member with a caster applied thereto;

FIG. 12 is a side view of a camper mounted on castered jack members;

FIG. 13 is a side elevational view of a trailer type camping vehicle showing the device of the invention mounted thereon; and FIG. 14 is a fragmentary view similar to a portion of FIG. 13 showing a slightly modified form of supporting and leveling device.

Referring now in detail to accompanying drawings, attention is directed first to FIG. 1 showing a camper, or camper unit, 20 mounted on a truck 22, both of known kind, in the present illustration the camper including a pair of superposed telescoping parts 24, 26. The camper is supported in the body 26 of the truck in the usual way, having a lower transversely reduced portion 30 received in the truck body, rearwardly of which is a transversely enlarged portion 32. Above these portions is a main body portion 34 which extends laterally over the side edges of the truck body, and the camper in most cases includes a top, forwardly projecting portion 35 overlying the cab 37 of the truck. The specific shape of the camper is of secondary importance as regards the present invention, the device of the invention being applicable to campers and camping vehicles of different kinds and shapes.

The loading, unloading, and leveling means of the invention includes a plurality of, and preferably four, jack members 36, one being secured to each corner, or near each corner, of the camper. The jack members 36 are mounted on the camper body by mounting means indicated generally at 38 and referred to again hereinbelow. Each jack member 36 is extensible and contractible for effecting the raising and lowering movements of the camper, or camper parts, and in this case is a fluid operated cylinder-ram device, preferably of pneumatic character.

Each cylinder-ram device includes a cylinder 40 of suitable character and for use in connection with a camper and similar device, may be made of aluminum for example, including an extensible member or ram 42 working in the cylinder, having a piston 44 of suitable construction. The ram or piston when in retracted position is engageable with a resilient bumper 46 mounted in the end of the cylinder for cushioning the impact of the ram upon contraction of the latter. The ram is provided with a foot 46 for engagement with the ground, or with other elements on the truck for elevating the camper, or a part thereof, upon extension of the ram as explained more in detail hereinbelow.

The mounting means 38 (FIGS. 1 and 7) each includes a split collar 48 having generally radially extending ears 50 with bolt and nut means 52 therein adapted, upon tightening thereof, for drawing up the split ring on the cylinder and thereby securing the mounting means on the cylinder. The split collar 48 is secured as by welding to a right angle bracket 54 which is fitted to the adjoining side surfaces of the body of the camper at the corresponding corner, the bracket being secured thereto as by screws or bolts 56 (FIG. 1). In the case of the camper unit of FIG. 1 two such mounting means 38 may be employed for each jack member, being spaced apart vertically a suitable distance and secured to the same part of the camper body, i.e., the upper part 34.

The jack members are operative for raising and lowering, selectively, only the top part of the camper unit or both parts together as a whole. In the case of lifting only the upper part, means are provided for working against by the jack members which in this case are mounted on the truck body and on the lower part of the camper unit. These means include a clip 58 at each rear corner of the lower part of the camper unit and swingable between an outer operative position shown in FIGS. 1 and 4 wherein its extended end is in register with and engageable by the ram of the corresponding cylinder-ram device, and an inner position shown in FIG. 5 in which it is out of such register and enables the ram to pass thereby. The reaction means also includes a clip 60 (FIGS. 1 and 2) pivotally mounted on each side of the truck body which is movable between an upper inoperative position shown in full lines in FIG. 2, and a lower operative position shown in dotted lines in that figure. The clip 60 is biased to upper inoperative position by suitable spring means 62 of known kind, and it is movable manually down to lower operative position wherein the butt end surface 64 engages the side of the truck body and it so retained in such position for engagement by and for supporting the ram of the corresponding jack member. Also mounted on each jack member at the front end of the camper is a clip 66 (FIGS. 1, 2, and 3) which includes a lifting lug 68 and a split collar 70 surrounding the jack member and having ears 72 extending generally radially. A lock bolt 74 having a hand grip is utilized in manually drawing up the ears and locking the split collar on the jack member. The clip 66 can be swung to inactive position shown in FIGS. 1 and 3 and to an active position shown in dotted lines in FIG. 2 where it enters into a cavity 78 and is positioned for engaging the under surface of the upper part 34 of the camper body.

To lift the upper part of the camper body, the clips 58 at the rear are swung outwardly into active position and the clips 66 are swung to inactive position shown in dotted lines in FIG. 2; then the lower clips 60 are swung down into active position, and the jack members extended. The clips 58 at the rear and the clips 60 at the front, provide the supporting and reaction means for lifting the upper part of the camper unit, the lower portion remaining in position in the truck. When it is desired to lower the upper portion of the camper unit, the jack members are retracted, as will be understood.

Also secured to the jack members 36 at the rear of the camper are additional clips 80 (FIGS. 1 and 6) which preferably are provided with manually manipulable lock bolts 74 as described in connection with FIG. 3. Each clip 80 includes a lifting lug 82 swingable between an operative position shown in full lines in FIG. 6 in which it is under and engageable with a lug 84 secured to the lower part of the camper unit, and an inoperative position, out of engagement therewith, as shown in dot-dash lines.

For raising the entire camper unit, the clips 58 at the rear of the camper unit are moved to inactive position, the clips 66 are also swung to inner active position and the clips 60 are permitted to swing upwardly to inactive position. Then the jack members are extended and the rams thereof engage the ground, as represented in FIG. 5. In this step of the operation the upper and lower parts of the camper unit are secured together, so that the lifting of the upper parts by the corresponding jack members also lifts the lower part. The clips 66 and 80, engaging under the lugs 84 and 78, enable the jack members to lift both portions of the camper unit together. The camper unit is lowered into position of course by reversing the steps and retracting the jack members.

The various mounting and clamping means may be provided with bolt and nut means 52 (FIG. 7) or quick-acting manual lock bolt means 74 (FIGS. 3 and 7), as desired, in accordance with practical considerations.

FIG. 8 shows another form of mounting means for the jack members which may be utilized if desired, this form eliminating the necessity for raising the camper to elevated positions in order to put the jack members in place. The supporting means shown in FIG. 8 includes a split clamp ring 86 which encircles the cylinder of the jack member and has ears 88 straddling a lug 90 secured to the angular bracket 92 which is secured directly to the body of the camper. Bolt and nut means 94 are inserted through openings in the ears and lug and upon tightening up thereof mount the split ring on the lug, and the jack member on the bracket. The split ring 86 with the arrangement of ears 88, enables the split ring to be placed on the jack member when separated from the camper, and then the ring applied to lug and secured thereto.

I have found pneumatic type cylinder-ram devices most advantageous for use in connection with campers of this general type. I have also found that it is most convenient to utilize a unit of precompressed gas, eliminating the necessity for a compressor and comparable devices. Tanks or bottles of carbon dioxide are generally available for this purpose and reasonable in cost and may be carried directly in the camper, such as represented in FIG. 9. Such a bottle of compressed gas is indicated at 96 from which gas lines 98 lead to the various cylinders of the jack members. These lines are located in any convenient position within the camper body, and connected with the cylinders as shown.

Novel valving control means is shown at 100 in FIG. 10 for controlling the flow of compressed gas from the tank or bottle 96 to the jack members. This means 100 is arranged in a unit, mounted in any convenient place such as the rear end of the camper as indicated in FIG. 9. The lines or tubing 98 include a main pressure line 102 leading directly from the tank 96 to the unit 100 and is provided with a main control inlet valve 104. The line 102 leads to branch lines 106 leading from the main line to respective ones of the jack members and in each branch line is a corresponding individual control valve 108. Another line 110 bypasses the valves 104 and 108, leading from the main line 102 through a control valve 112 to an air jet vacuum pump 114, of known kind. Leading to this pump is another line 116 in which is a valve 118, the line leading from the branch lines 106.

To extend the jack members, and raise the camper, the main valve 104 is opened enabling the compressed gas to flow therethrough and into the branch lines 106 and the cylinder ram devices of the jack members are thereby extended. The individual control valves 108 are adjusted to the desired settings for individually controlling the respective jack members for extending them to the desired heights to compensate for uneveness in the ground. In this step valves 112 and 118 are of course closed. After the jacks are so extended the main control valve 104 is closed.

The rams of the cylinder-ram devices may be manually retracted, but this is relatively slow in operation and may require substantial manual force. In order to overcome these disadvantages, the air jet vacuum pump 114 is provided, and to contract the jack members, the valve 112 is opened, and with the valve 118 remaining open, the compressed gas from the main line 102 flows through the line 110 and into the vacuum pump which draws the air from the cylinders through the line 116, rapidly retracting the rams of the jack members.

Locking means is also provided for locking the rams selectively in extended or retracted positions. The locking means, indicated at 120 in FIG. 9 each includes a split ring 122 encircling the ram 42 and secured to the end of the cylinder by suitable means such as screws 124 mounted in the ring and threaded into the lower end of the cylinder. Preferably the rings are provided with quick acting lock bolts 74 (FIG. 7) and on the rings being drawn up, they are clamped and locked on the ram. For traveling purposes, the ring is clamped tight on the ram when the ram is retracted, as indicated at the left in FIG. 9, and on the other hand when the ram is extended to the desired height and it is desired to lock the jack members in extended position for more effectively stabilizing the camper, the rings are locked in position with the rams so extended.

The jack members can be adjusted as to height in their mounting on the camper by simply loosening the rings of the mounting means 38 (FIG. 1) and adjustably positioning the jack members as desired.

Another advantage of the invention is that the means is adapted for supporting the camper directly on the ground for limited mobility. The doors of many garages are not sufficiently high to permit access by a camper-mounted truck and heretofore it has been necessary to place the camper on some other means, usually improvised, for moving the camper into a garage, when that is desired. That disadvantage is overcome in the present invention by providing casters 126 (FIGS. 11 and 12) of suitable kind, by inserting the shanks 128 thereof into apertures 130 provided therefor in the extended ends of the rams 42. When the camper is then placed on the ground, it can be moved, as by man-handling, into the garage.

The provision of the casters 126 also facilitates loading of the camper. In the use of the casters, it is not necessary to perfectly align the truck with the camper and back the truck into position, but the truck may be merely roughly positioned, and then the camper moved toward the truck, and in so moving is more easily guided into proper position for loading.

FIGS. 13 and 14 show the device of the invention applied to a trailer type of camping vehicle. In FIG. 14 the trailer 132 is of known type and the jack members 36 are mounted as by positioning the cylinders 40 thereof in openings in the trailer body and securing them in position by suitable means. The rams 42 extend downwardly and engage the ground, lifting a substantial portion of the weight from the wheels and stabilizing the trailer.

In FIG. 14 the jack members 36 are pivotally connected at 134 to the frame 136 of the trailer and swingable angularly upwardly into inactive position shown in dotted lines and releasably secured in such position. In this manner the entire interior of the trailer is utilized for living purposes and the jack members do not detract from that purpose, and in both cases, the jack members are entirely under the vehicle and do not add to the width thereof.

While I have shown herein certain preferred forms of the invention, it will be understood that changes may be made therein within the spirit and scope of the appended claims.

I claim:

1. A device of the character disclosed for use in conjunction with a vehicle, the vehicle including upper and lower telescoping parts, the upper part being adapted to be elevated independently of the lower part, and the two parts being adapted to be secured together for elevating the whole vehicle as a unit, the device comprising a plurality of jack members mounted on and carried by the vehicle, the jack members including cylinder-ram devices having cylinders secured to the upper part of the vehicle, and rams extensible therefrom which upon extension thereof and engagement with reaction surfaces are operative for elevating the vehicle, power means carried by the vehicle operative for extending said extensible elements, and collars on the cylinders swingable around the axes thereof into and out of operative position for engaging elements on the lower part of the vehicle, said collars when in operative position being operative for lifting the lower part of the vehicle and thereby the entire vehicle upon extension of the jack members, said collars when in inoperative position permitting elevation of only the upper part of the vehicle upon extension of the jack members.

2. A device of the character disclosed for use in conjunction with a vehicle, comprising a plurality of jack members mounted on and carried by the vehicle, the jack members having extensible elements which upon extension thereof and engagement with reaction surfaces are operative for elevating the vehicle, power means carried by the vehicle operative for extending said extensible elements, the vehicle being adapted for mounting on a carrier and when so mounted the load of the vehicle is removed from the jacks and incapable of biasing the extensible elements to retracted position, the jack members including compressed gas operated cylinder-ram devices, and the power means includes a source of compressed gas and control means for selectively introducing gas into the cylinder-ram devices and for exhausting the compressed gas from the cylinder-ram devices so as to produce retraction of the extensible elements by atmospheric pressure.

3. A device of the character disclosed for use in conjunction with a vehicle, comprising a plurality of jack members mounted on and carried by the vehicle, the jack members having extensible elements which upon extension thereof and engagement with reaction surfaces are operative for elevating the vehicle, power means carried by the vehicle operative for extending said extensible elements, the jack members including cylinder ram devices each including a cylinder and an extensible ram, means for mounting the cylinder on the vehicle including split collars surrounding the cylinder and secured to the vehicle, said collar being frictionally secured to the cylinder and releasable therefrom for adjusting the jack members vertically relative to the vehicle, and additional split collars surrounding the rams and secured to the cylinders, and frictionally engage the rams, and quick-releasable manually actuated means for releasably tightening the latter collars on the rams, said latter collars being operative for locking the rams in retracted position, as in traveling, and locking them in extended position for supporting the camper by the extensible elements on the ground.

References Cited
UNITED STATES PATENTS

| | | | |
|---|---|---|---|
| 1,843,852 | 2/1932 | Troy | 60—57UX |
| 2,168,062 | 8/1939 | Davey | 296—23.3 |
| 2,372,705 | 4/1945 | Bicker | 214—515UX |
| 2,577,874 | 12/1951 | Carnahan | 60—57 |
| 2,624,477 | 1/1953 | Messick | 214—77(P) |
| 2,655,412 | 10/1953 | Jones | 60—57UX |
| 2,831,588 | 4/1958 | Seed | 214—38.22UX |
| 2,879,103 | 3/1959 | Hall | 296—23.3 |
| 2,985,482 | 5/1961 | Lion | 214—515 |
| 3,002,760 | 10/1961 | Lee | 214—515X |
| 3,315,942 | 4/1967 | Buberniak | 214—515X |
| 3,338,554 | 8/1967 | Gostomski | 254—45X |

LEO FRIAGLIA, Primary Examiner

J. A. PEKAR, Assistant Examiner

U.S. Cl. X.R.

214—515; 254—45; 280—400, 475